United States Patent [19]
Smith et al.

[11] Patent Number: 5,629,404
[45] Date of Patent: May 13, 1997

[54] IMPACT RESISTANT POLYMERS BASED ON BISPHENOL-A-POLYCARBONATE

[76] Inventors: Douglas A. Smith, 325 Beaver Ct., Johnstown, Pa. 15905; Charles W. Ulmer, II, 706 Belmont, Johnstown, Pa. 15904

[21] Appl. No.: 479,031

[22] Filed: Jun. 7, 1995

[51] Int. Cl.$^6$ .................................................. C08G 64/00
[52] U.S. Cl. ..................... 528/196; 528/176; 528/198; 528/354; 528/373; 528/397; 528/398; 528/401
[58] Field of Search ..................... 528/196, 198, 528/176, 354, 373, 398, 397, 401, 332, 129, 125

[56] References Cited

U.S. PATENT DOCUMENTS

| | | |
|---|---|---|
| 3,567,686 | 3/1971 | White et al. . |
| 3,684,766 | 8/1972 | Jackson, Jr. . |
| 3,723,389 | 3/1973 | Khattab . |
| 3,738,963 | 6/1973 | Praetorius et al. . |
| 3,816,373 | 6/1974 | Hoogeboom . |
| 3,974,126 | 8/1976 | Narita et al. . |
| 4,079,038 | 3/1978 | Choi et al. . |
| 4,107,143 | 8/1978 | Inata et al. . |
| 4,587,312 | 5/1986 | Hergenrother et al. . |
| 4,696,995 | 9/1987 | Peters . |
| 4,831,100 | 5/1989 | Komatsu et al. ..................... 528/198 |
| 5,021,541 | 6/1991 | Masumoto et al. . |
| 5,049,644 | 9/1991 | Petri ..................... 528/202 |
| 5,104,964 | 4/1992 | Kuze et al. ..................... 528/204 |
| 5,140,094 | 8/1992 | Kohn et al. . |
| 5,264,537 | 11/1993 | Kohn et al. . |
| 5,340,905 | 8/1994 | Kuhling et al. . |
| 5,360,889 | 11/1994 | Watanabe et al. ..................... 528/371 |

*Primary Examiner*—Terressa Mosley
*Attorney, Agent, or Firm*—Dennison, Meserole, Pollack & Scheiner

[57] ABSTRACT

A high impact polymer comprising repeating monomer units of the formula:

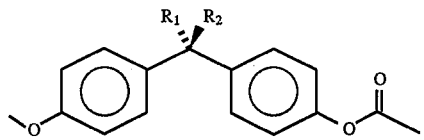

wherein $R_2$ and $R_2$ are substituents selected from the group consisting of hydrogen, an alkyl group, an aryl ring and a group promoting hydrogen bonding with a hydrogen atom of a phenyl ring, at least one of $R_1$ and $R_2$ being from the group promoting hydrogen bonding.

8 Claims, No Drawings

IMPACT RESISTANT POLYMERS BASED ON BISPHENOL-A-POLYCARBONATE

BACKGROUND OF THE INVENTION

The invention relates to the field of impact resistant polymers, particularly polymers based on bisphenol-A-polycarbonate.

Impact resistant polymers have found a wide variety of uses as glass substitutes in both military and non-military applications. Such polymers have been used as windshields and windscreens on vehicles, canopies and windows on aircraft, face protection devices, optical storage disks, housings for appliances and business machines and ophthalmic frames and lenses. Due to the weight advantages of these polymers relative to glass, the polymers may also find use as windows for buildings.

Among the transparent polymers which have been used are polycarbonates and acrylics. While polycarbonates have greater impact strength than acrylics, they are not typically used because of limited wearability; the scratch and chemical resistance of these materials has been poor. However, an improvement in impact resistance could lead to an improvement in cost-benefit analysis and life cycle cost and make these materials cost effective competitors to acrylics.

The chemical, physical and mechanical properties which lead to desirable impact resistance for polycarbonates have not been well understood. Polycarbonates dissipate energy upon impact by way of a yielding mode of failure which offers better protection from high energy projectiles than materials which craze and/or crack. This ductile mode of failure upon impact usually results in a punched out plug or closed hole rather than spallation; this provides better ballistic protection and better residual optics.

Numerous theories have been proposed for this ductile mode of failure as opposed to the brittle failure characteristics of many other transparent polymers but no conclusive evidence, nor any hypothesis which accounts for all of the experimental data has been offered to date, and significant improvement in ballistic protection performance in transparent polymers has not been achieved.

The molecular level structure of polycarbonate has been studied by a wide variety of experimental and computational techniques in an attempt to link the mechanical behavior to chain motions occurring at the atomistic level. Single chains of glassy polycarbonate were found to show random coil behavior through light scattering, small angle X-ray scattering and small angle neutron scattering experiments. Wide angle light scattering experiments showed a single phase behavior of glassy polycarbonate with no large regions of strong intermolecular orientation correlations, while wide angle X-ray and neutron scattering analyses indicated that there were many small regions of "enhanced order" in the bulk material, consisting of no more than two or three repeat units. These regions are too small to alter the overall random coil behavior of the chain or to show fluctuations in the optical anisotropy of polycarbonate.

Various nuclear magnetic resonance (NMR) techniques have been used to isolate the motions in polycarbonate. The most obvious motions are 180° flips around the $C_2$ axis of the phenyl groups, rotation about the $C_3$ axes of the methyl groups and oscillations about the $C_2$ axes of the phenyl groups accompanied by 15° main chain reorientation. $^1$H NMR line width experiments at various applied hydrostatic pressures showed that the ring flips were suppressed by increased pressure while it was proposed that main chain motions enabled the phenyl ring flips to occur by increasing volume.

Computer models of glassy polycarbonate have been subject to hardware and software limitations. A force field specifically for polycarbonate in the amorphous bulk state was developed recently by Hutnik et al., Macromolecules, 24:5956 (1991), based on the conformational characteristics of the fragment molecules diphenyl carbonate and 2,2 diphenyl propane. They performed quasi-static chain dynamics based on previously proposed static microstructures of amorphous polycarbonate and found that there was significant cooperativity between the motions of the phenyl ring, carbonate group and main chain. More significantly, they found that there was a strong influence of chain packing on the energetics of the analyzed motions and that the phenyl ring flips had far reaching effects which were especially manifest on the carbonate conformation in "soft" regions of the structure. However, the authors concluded that their computations results were not consistent with experimental reality.

An attempt has also been made to improve the properties of polycarbonate by blending with polysulfones or polyetherimides, as reported by Coleman, "Mechanical Properties of Polycarbonate, Polysulfone and Polycarbonate-Polyetherimide Blends," Final Report, NATICK/TR-91-025, April 1991. The polysulfones and polyetherimides were found to be immiscible with polycarbonate and there was no evidence that any intermolecular reactions occurred. The polysulfones and polyetherimides were found to be too stable to undergo any chain scission reaction at temperatures which are low enough to prevent the degradation of the polycarbonate.

SUMMARY OF THE INVENTION

It is therefore an object of the invention to provide impact resistant polymers of improved wearability and impact resistance.

To achieve this and other objects, the invention relates to improved bisphenol-A polycarbonate polymers having repeating monomer units of the formula:

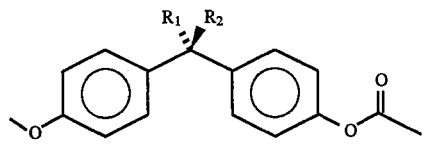

wherein at least one of $R_1$ and $R_2$ is a Lewis base, a group promoting hydrogen bonding, the other of $R_1$ and $R_2$ being a hydrogen, an alkyl group, an aryl ring, or the same or different Lewis base. Thus $R_1$ and $R_2$ are selected from the group consisting of methyl, fluorine, chlorine, bromine, carbonates, esters, amides, lactones, sulfoxides, sulfones, sulfonamides, amines, thioethers, disulfides, ethers, haloalkyl and alcohols. $R_1$ and $R_2$ can also be part of a single ring. In typical prior art polycarbonates, both $R_1$ and $R_2$ are methyl.

DETAILED DESCRIPTION OF THE INVENTION

Through numerous computer modeling studies of polycarbonate polymers, applicants have concluded that hydrogen bonding is a key element in the energy dissipation and mode of failure of polycarbonates upon impact. Hydrogen bonding is generally defined as an attractive force or bridge which occurs between a hydrogen atom of one molecule and two or more electrons of another molecule or another portion of the first molecule where those electrons are not involved in sigma bonds on the bonds which hold the skeleton of the molecule together. Hydrogen bonding is also possible to the electrons of groups of atoms which are not highly electronegative, for example, the pi electrons of an aromatic ring such as benzene. Further, hydrogen bonding is possible to hydrogen atoms which are covalently bonded to non-electronegative atoms such as carbon. While hydrogen bonds are weak, they are known to have pronounced effects on the properties of materials in which they occur, particularly melting and boiling points and crystal structure.

In considering the polycarbonate systems of the invention, multiple weak bonds, such as hydrogen bonds, may allow for the absorption of energy upon impact through coupling of the low frequency vibrational modes with the mechanical energy delivered upon impact. This would lead to increased motion within the polymer matrix without breaking the chemical bonds in the polymer backbone.

Hydrogen bond acceptors are typically Lewis bases, that is, they are electron pair donors. Not all Lewis bases are strong enough to be hydrogen bond acceptors when the donor is weak, such as the hydrogen on a benzene ring. Moreover, in order to properly synthesize the polymers of the invention by condensation, it is necessary to avoid certain Lewis bases. With this in mind it is possible to define substituents $R_1$ and $R_2$ as follows:

1. Carboxylic acid derivatives, such as esters(COOR), lactones(cyclic esters), amides($CONR_2$) and carbonates(O-C(=O)-O). The R group of the esters and amides can be alkyl, alkenyl, alkynyl, or allyl, straight or branched chain, typically with 1 to 6 carbon atoms, or can be aromatic, such as phenyl or substituted phenyl, or a combination, such as benzyl. Preferred R groups are those which are electron donating rather than electron withdrawing (alkyl rather than nitrophenyl), and those which are not sterically large enough to prevent the hydrogen bond donor from approaching the carbonyl oxygen of the acceptor. R groups bearing one or more halogens would disfavor hydrogen bonding. The amides can be primary(no R groups on the nitrogen), secondary(one R group) or tertiary(two R groups), and the R groups can be the same or different, within the limitations discussed above.

Carboxylic acids themselves are precluded because they would not survive the condensation polymerization.

2. Oxidized forms of sulfur, such as sulfoxides(R-S(=O)-R), sulfones (R-S(=O)$_2$-R) and sulfonamides(S(=O)-$NR_2$). The R groups are as defined above.

3. Oxidized forms of phosphorus, that is, any functional group with the P=O moiety. R is as defined above.

4. Other carbonyl-containing functional groups, such as ketones and aldehydes, where R is as defined above.

5. Nitrogen-containing functional groups, such as primary ($NH_2R$), secondary($NHR_2$) and tertiary($NR_3$) amines. The amines may be aliphatic or aromatic, cyclic or acyclic. There may be more than one amine or nitrogen in the system, e.g. imidazole, pipeddine, piperazine, etc. The R group is as defined above. Certain primary amines may present difficulties in the condensation polymerization, and would not be suitable. Amines containing strongly electron withdrawing groups, such as nitro, would not be suitable.

6. Halogens, in particular, fluorine, chlorine and bromine, and organic halides. Preferred organic halide groups include trifluoromethyl, trichloromethyl, and perhalogenated groups larger than methyl. Halogens on aromatic rings are not strongly preferred since they are thought to be less strongly hydrogen bond accepting due to resonance interactions of the halogen lone electron pair with the aromatic system.

7. Ethers and thioethers. These may be aliphatic(acyclic or cyclic) or aromatic, although aromatic or bulky R groups directly attached to oxygen or sulfur would disfavor hydrogen bonding based on electronic or steric grounds, respectively.

8. Alcohols, in particular primary and secondary alcohols, attached to the polymer backbone by an alkyl chain of from 1 to 18 carbons, a chain length of 1 to 6 carbons being preferred; or by a system of one or more aliphatic cyclic systems, one ring being preferred. These alcohols are accessible through the diborane reduction of the corresponding esters.

9. Any other functional group which contains a heteroatom bearing a sterically unencumbered lone pair of electrons, and in which the heteroatom is not conjugated with a polyolefin or aromatic system.

The preferred polymers will be based on repeating monomer groups of

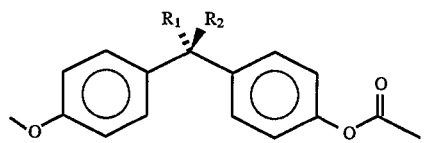

where $R_1$ and $R_2$ are exemplified by, but not limited to, the following substituents:

| Example | | |
|---|---|---|
| 1 | $R_1 = CH_3$ | $R_2$ = 4-pyridyl |
| 2 | $R_1$ = CH3 | $R_2$ = 3-pyridyl |
| 3 | $R_1, R_2 =$ | 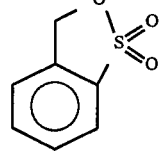 |
| 4 | $R_1, R_2 =$ | 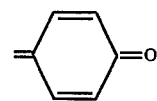 |

Polyesters based upon substituents of Examples 3 and 4 are known from Jedlinski, Z., *Acta Chimica Academiae Scientiarium Hungaricae*, 1974, 81:299. These polyesters exhibited enhanced thermal stability over conventional bisphenol-A based polyesters, but there is no information regarding mechanical properties.

It is theorized that the polymers of Example 3 will exhibit improved hydrogen bonding as compared to the lactone carbonyl due to the presence of the sulfonate group. The hydroquinone structure of Example 4 has a resonance form placing excess negative charge on the carbonyl oxygen, increasing its propensity to form hydrogen bonds. Since the carbonyl oxygen is removed from the oxygen backbone, this may increase chain mobility and reduce steric interference towards hydrogen bonding.

The polymers are synthesized via ester exchange condensation polymerization, as disclosed in Sorensen et al., *Preparative Methods of Polymer Chemistry*, 2nd Ed., Interscience Publishers, N.Y., 1968. Another method which may be used is interfacial polymerization using phosgene as the carbonate precursor, as reported in the Jedlinski reference cited above. This transesterification method requires temperatures as high as 300° C. to drive off phenol and form the high molecular weight polymer. A low temperature interfacial polycondensation of bisphenol-A and bis(4-nitrophenyl) carbonate (derived from triphosgene and 4-nitrophenol) was described in Sivaram, *Makromolekulare Chemie, Rapid Communications*, 1993, 14:173. The polycondensation formed a high molecular weight polycarbonate at room temperature at greater than 95% yield.

The Jedlinski, Sorensen and Sivaram publications are incorporated herein by reference.

The synthesis of a polycarbonate having a substituent group of the formula

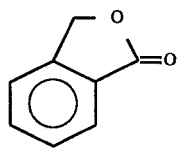

I was reported in Mikaroyannidis, *European Polymer Journal*, 1986, 22:125. This polymer exhibited a glass transition temperature of 272° C., as compared with 145° C. for BPA-polycarbonate. Literature data showed that this material had a tensile strength of 17,000 psi at room temperature and elongation of 10–14%, as compared with 8,000 psi and 7–10%, respectively, for conventional polycarbonate.

The polymers of the invention can be made up entirely of repeating monomer units as described hereinabove, or may be a copolymer in which repeating monomer units as described are intermixed with other monomer units.

What is claimed is:

1. A high impact bisphenol-A-polycarbonate polymer comprising repeating monomer units of the formula:

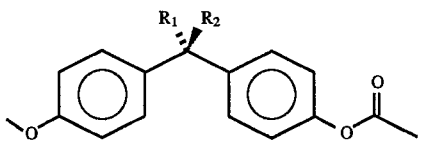

wherein at least one of $R_1$ and $R_{226\ 2}$ is a group promoting hydrogen bonding with a hydrogen atom of a phenyl ring, selected from the group consisting of;

a) carboxylic acid derivatives selected from the group consisting of esters —COOR$_3$, lactones, amides —CONH$_2$, —CONHR$_3$ or —CON(R$_3$)$_2$ and carbonates O-C(=O)-O, where R$_3$ is a C$_1$-C$_6$ alkyl, alkenyl, alkynyl or allyl straight or branched chain group or a phenyl or substituted phenyl group;

b) sulfoxide R$_3$-S(=O)-R$_3$, sulfone R-S(=O)$_2$-R$_3$ or sufonamide S(=O)-N(R$_3$)$_2$, where R$_3$ is as defined above;

c) a functional group with P=O and R$_3$ as defined above;

d) ketones and aldehydes with R$_3$ as defined above;

e) primary, secondary and tertiary amines including R$_3$ as defined above;

f) halogens X and organic halides R$_4$X, where R$_4$ is a C$_1$-C$_6$ alkyl, alkenyl, alkynyl or allyl straight or branched chain group;

g) ethers and thioethers including R$_4$ as defined above; and h) primary and secondary C$_1$-C$_{18}$ aliphatic and aliphatic cyclic alcohols.

2. The polymer of claim 1, wherein said group promoting hydrogen bonding is a primary or secondary alcohol attached to the polymer by an alkyl chain of from 1 to 18 carbon atoms.

3. The polymer of claim 1, wherein said group promoting hydrogen bonding is:

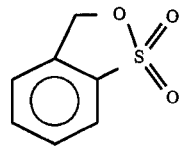

4. The polymer of claim 1, wherein said group promoting hydrogen bonding is:

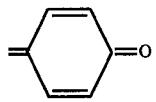

I

5. The polymer of claim 1, wherein said group promoting hydrogen bonding is pyridyl.

6. The polymer of claim 1, wherein said group promoting hydrogen bonding is an amine selected from the group consisting of imidazoles, piperidines and piperazines.

7. The polymer of claim 1, wherein said group promoting hydrogen bonding is a trifluoromethyl or trichloromethyl group.

8. The polymer of claim 1, wherein X is fluorine, chlorine or bromine.

* * * * *

UNITED STATES PATENT AND TRADEMARK OFFICE
CERTIFICATE OF CORRECTION

PATENT NO. : 5,629,404
DATED : May 13, 1997
INVENTOR(S) : DOUGLAS A. SMITH et al

It is certified that error appears in the above-indentified patent and that said Letters Patent is hereby corrected as shown below:

In the ABSTRACT:

line 4, change "wherein $R_2$" to --wherein $R_1$--.

Column 3, line 56, change "pipeddine" to --piperidine--.

Column 5, line 41 (Claim 1), change "$R_{226\ 2}$" to --$R_2$--.

Signed and Sealed this

Fourteenth Day of October, 1997

Attest:

BRUCE LEHMAN

Attesting Officer

Commissioner of Patents and Trademarks